United States Patent [19]

Hallerbäck

[11] 4,343,565
[45] Aug. 10, 1982

[54] FASTENING SLEEVE

[75] Inventor: Stig L. Hallerbäck, Gothenburg, Sweden

[73] Assignee: Aktiebolaget SKF, Gothenburg, Sweden

[21] Appl. No.: 95,580

[22] Filed: Nov. 19, 1979

[30] Foreign Application Priority Data

Jan. 22, 1979 [SE] Sweden ............................... 7900526

[51] Int. Cl.³ .............................................. F16B 2/00
[52] U.S. Cl. ..................................... 403/370; 308/236
[58] Field of Search ...................... 403/371, 370, 372; 279/1 Q; 308/236

[56] References Cited

U.S. PATENT DOCUMENTS

| 2,896,954 | 7/1959 | Ernest | 279/1 Q |
| 3,253,136 | 5/1966 | Faul | 403/371 X |
| 3,501,183 | 3/1970 | Stratienko | 403/370 |
| 3,614,140 | 10/1971 | Nestor | 403/370 X |
| 3,957,385 | 5/1976 | Ullberg | 403/370 |

Primary Examiner—Andrew V. Kundrat
Attorney, Agent, or Firm—Eugene E. Renz, Jr.

[57] ABSTRACT

The invention refers to a fastening sleeve for fastening machine members such as bearings or gear wheels to a shaft. The fastening sleeve is characterized by a body of pressed sheet metal, which is embedded or encapsulated in a housing made of plastic material. One surface of the fastening sleeve is tapering and one axial end of the body is free from moulding compound projecting outwardly beyond one axial end of the plastic housing.

9 Claims, 8 Drawing Figures

FASTENING SLEEVE

BACKGROUND AND SUMMARY OF THE INVENTION

The present invention refers to a fastening sleeve for fastening different machine members such as bearings or gear wheels to a shaft.

Different devices for fastening of machine members to a shaft are earlier known. Such devices, which are made of steel, can be expansion sleeves, members incorporating wedge grooves, tapering fastening sleeves and the like. A conventional method of fastening e.g. a bearing to a shaft is to provide the bearing with a tapering bore and to use a tapering fastening sleeve, upon which the bearing is driven up by means of a nut which is locked after the driving up operation is completed. Such a sleeve provides a reliable connection but it requires a tapering bore in the bearing and it is also necessary to manufacture both sleeve and bearing with the utmost accuracy. This means that the sleeve will be very expensive and almost as expensive as the bearing itself. Another very big drawback in the use of fastening sleeves of steel is their big tendency of causing "fretting corrosion" which sometimes can occur after a very short time of use. It has, therefore, since long been strongly desired to be able to provide a fastening member of a less expensive type, which will still provide the same or even a better fastening function than the mentioned steel sleeve.

These problems have according to the invention been solved by providing a fastening sleeve, which incorporates a slotted body of pressed sheet metal, which is embedded in a plastic material or the like whereby one surface of the sleeve is tapering and one axial end of the body is free from the moulding compound.

The sheet metal body of the fastening sleeve is primarily intended as a good reinforcement for the plastic material moulded thereabout, but it has thereabove as a primary task to transfer and distribute the forces, which are required for the axial displacement of the fastening sleeve at assembly and dismounting respectively. One axial end surface of the sheet metal body shall hereby be free from the plastic material moulded thereabout since the end surface which forms a stop at the mounting must necessarily be purely metallic for being able to withstand the pressure load, which will occur. It is appropriate that the sheet metal body when embedded in plastic is centered in the moulding tool at its pure metallic end surface and thereabove by means of projections on sheet metal tongues, which are stamped in the sheet metal and which support and center the sheet metal body against the central mandrel of the moulding tool as well as against its outer parts. Besides its centering function during the moulding process these supporting elements form desirable friction spots after the assembly of the fastening sleeve.

In order to increase the adherance between the sheet metal body and the plastic the sheet metal body is provided with perforations. During the moulding process these perforations act thereabove as pressure compensating channels between the two envelope surfaces of the thin sheet metal body.

At perforation of the sheet metal body it is possible to allow sheet metal lugs at least at some of the breaking through points to be designed to form stops at the moulding operations or friction points after the assembly. The plastic compound in which the sheet metal body is embedded will give the fastening sleeve its shape and its tolerance zone. The assembly force used against the sheet metal body is transferred via the plastic compound to pressure and friction forces, which are adapted to the function for which the fastening sleeve is intended.

One of the envelope surfaces of the fastening sleeve, either the inner one or the outer one is always made tapering whereas the sleeve in the axial direction is slotted in order to allow the expansion which is aimed at during the mounting of the sleeve.

At one of its axial ends the sheet metal body can be provided with threads, a mounting ring or the like or one end of the sheet metal body can alternatively project outside the embedment and there form a stop. At fastening of machine members having tapering center bores, e.g. ball bearings with tapering centre bores, only one fastening sleeve is used the outer envelope surface of which is tapering.

When fastening machine members having cylindrical central bores two fastening sleeves are used, the tapering envelope surfaces of which are adapted for being driven up against each other.

A common advantage at the use of fastening sleeves according to any embodiment of the invention is that the sleeves cannot give rise to fretting corrosion which is very important.

DESCRIPTION OF THE DRAWINGS

The invention will hereinafter be further described with reference to the accompanying drawings.

DESCRIPTION OF THE PREFERRED EMBODIMENTS

Figure 1:
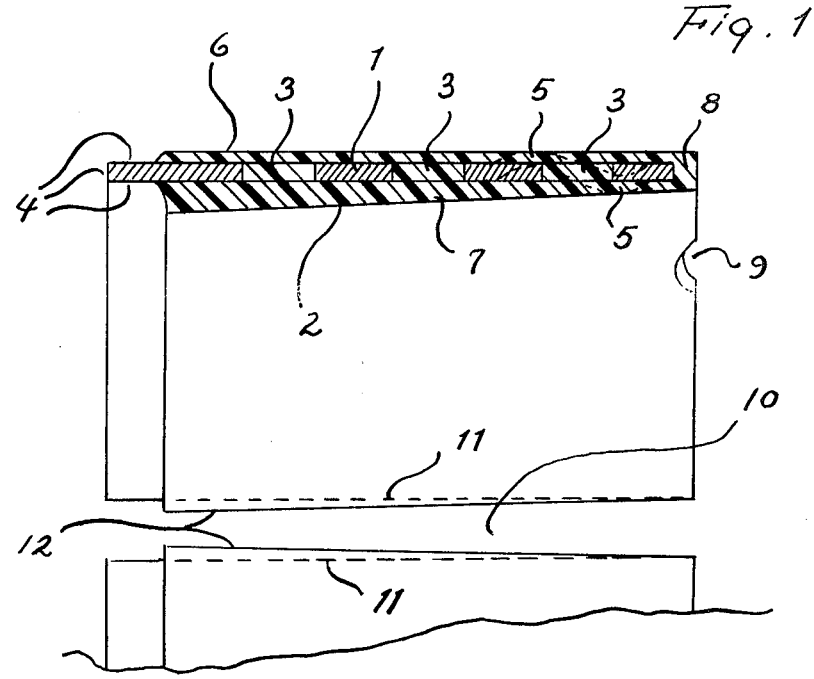
FIG. 1 shows a partial view and a section of a fastening sleeve.

FIG. 1 shows in a partial view and a section a fastening sleeve incorporating a sheet metal body 1 provided with anchoring and pressure compensating holes 3. The sheet metal body is free from plastic material at one of its ends 4, whereas the other end is embedded in a housing of plastic material 8. The axial position of the sheet metal body in the fastening sleeve is fixed by means of a number of supporting elements, which form axial indentations 9 in the plastic compound. The fastening sleeve shown in the figure has an outer cylindrical plastic envelope surface 6, whereas the plastic compound against the centre forms a tapering limit surface 7.

The sheet metal body has a number of stamped warts or projections 5, which will give the sheet metal body a sufficient support in the moulding tool during the pouring of the plastic compound.

The axial slotting 10, which is necessary for allowing the radius of the fastening sleeve to expand at the mounting, requires that the sheet metal body 1 be formed with an axial opening 11. The plastic compound shall preferably at this axial slot be formed by means of a wedge-shaped member in the moulding tool, whereby a clearance 12 is obtained.

Figure 2:
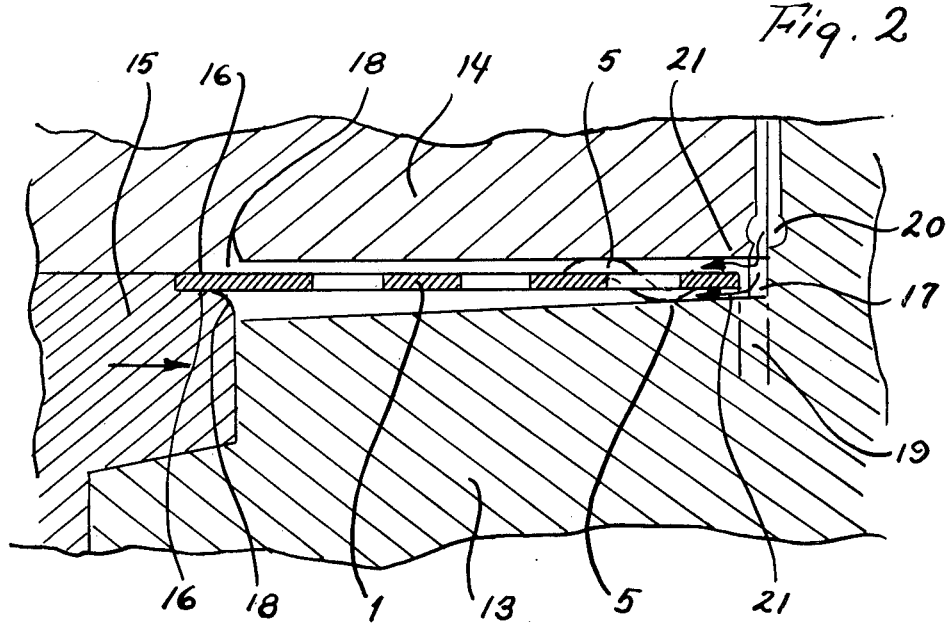
FIG. 2 shows a section through the moulding tool with a mounted sheet metal body.

FIG. 2 shows a section through the moulding tool for the fastening sleeve, where 13 is the centre mandrel, whereas the outer casing 14 of the tool has an end portion 15 designed as an ejector for the detail at the same time as the end portion 15 forms an end support 16 for the sheet metal body 1. This is centred in the tool by means of the warts 5. A certain number of smaller elements 17 form axial stops for the sheet metal body and ascertain that this is inserted into the support 16, which operation is further facilitated by the smooth curvature 18, which forms an entering chamfering at the outer casing and at the end portion. The annular portion 19 formed between the centre mandrel and the sheet metal body will give the plastic compound a possibility to pass via the pouring ingates 20 as shown by arrows 21 at the same time on both sides of the sheet metal body, which will guarantee that this body will not be deformed at the moment of pouring.

Figure 3:
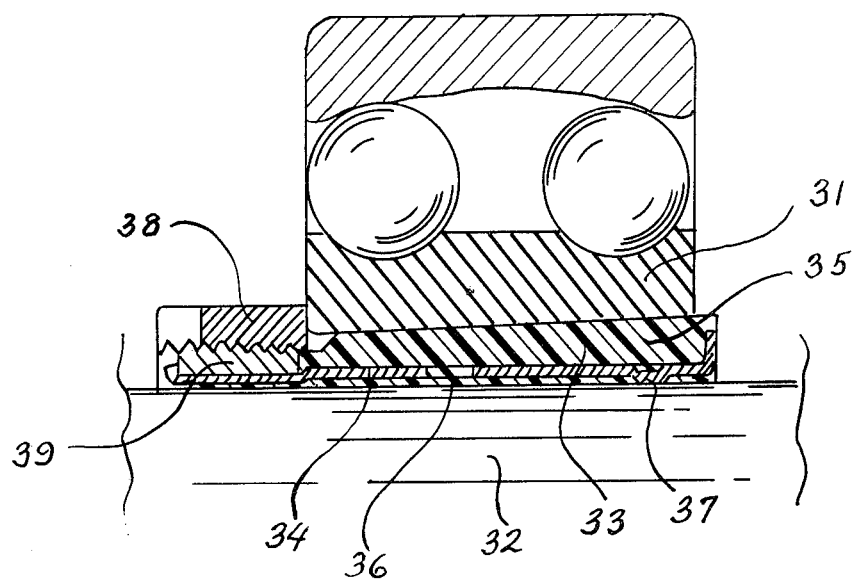
FIG. 3 shows in section the fastening of a two-row spherical ball bearing with a tapering bore.

In FIG. 3 is shown a double-row spherical bearing with an inner race ring 31 having a tapering bore. This is fastened to a shaft 32 by means of a fastening sleeve 33. This fastening sleeve 33 comprises a body 34 about which plastic material 35 has been moulded. Such as shown the body is perforated at 36 and has a bulging or projection 37, which forms the contact point with the shaft 32. The surfaces between the inner race ring 31 and the sleeve 33 are tapering and for the driving up of the inner race ring 31 on the sleeve 33 a nut 38 is used, which cooperates with an assembly ring 39, which is fitted to the sheet metal body 34.

Figure 4:
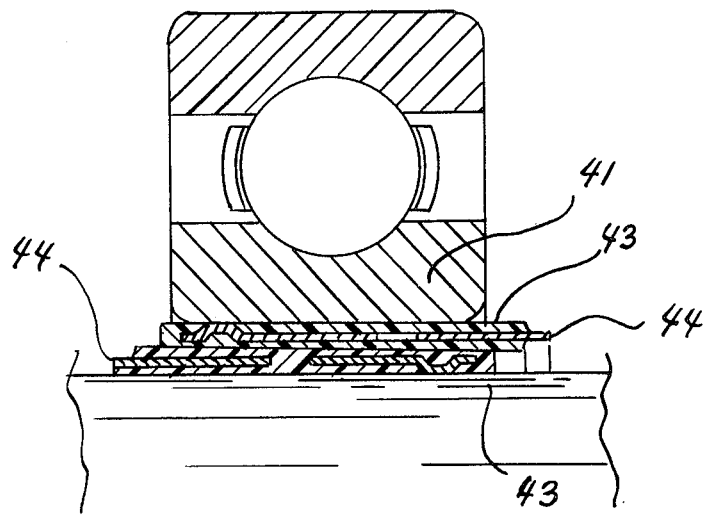
FIG. 4 shows the fastening of a groove ball bearing with cylindrical bore.

In FIG. 4 is shown the bearing having an inner race ring 41, which has a cylindrical bore. The fastening of this bearing is carried out by means of two sleeves 43, which both have tapering surfaces facing each other. The angle of the tapering surface shall be so small that the device will be irreversible. For driving up the sleeves onto each other stops 44 have been formed at the axial ends of both sleeves. In the present case the bearing can thus be fastened by means of a hammer only and if necessary a counter stay.

Figure 5:
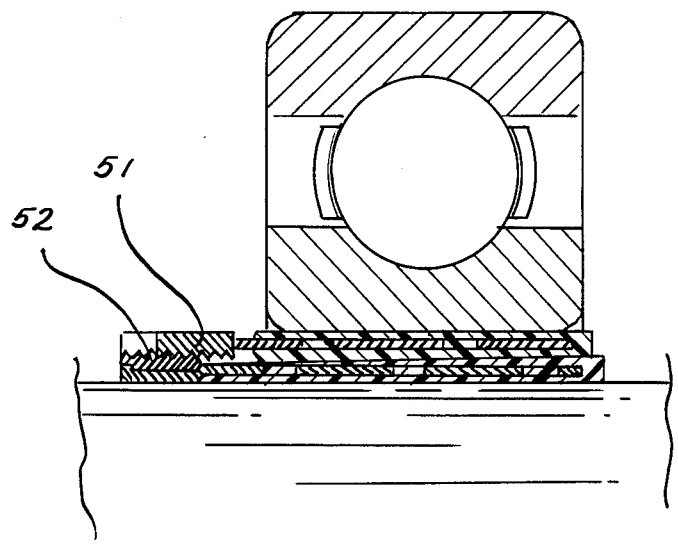
FIG. 5 shows another embodiment of the device according to FIG. 4.

FIG. 5 shows the fastening of the same type of bearing as shown in FIG. 4. One of the sleeves has in this case been made somewhat longer than the other in axial direction and the other or outer sleeve is driven up onto the inner sleeve by means of the nut 51, which cooperates with the assembly ring 52.

Figure 6:
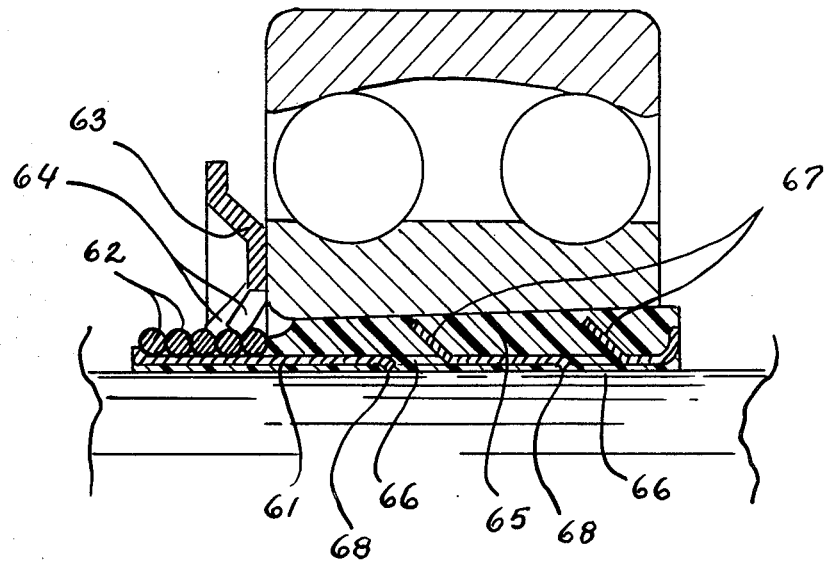
FIG. 6 shows a further embodiment of fastening of a member having a tapering bore.

FIG. 6 shows a further fastening of an element with a tapering bore to a shaft. In this case the sheet metal body 61 has been provided with a coil 62, which cooperates with a clamping device 63 of pressed sheet metal. The teeth 64 of the clamping device are bent upwards in the form of threads, whereby the clamping device 63 can push the machine member up onto the tapering surface of the sleeve 65. As shown in the figure the sheet metal body is broken through at 66 and the sheet metal lugs 67 are bent upwards. The edges 68 can also be bent somewhat to form supporting points for the sheet metal body.

Figure 7:
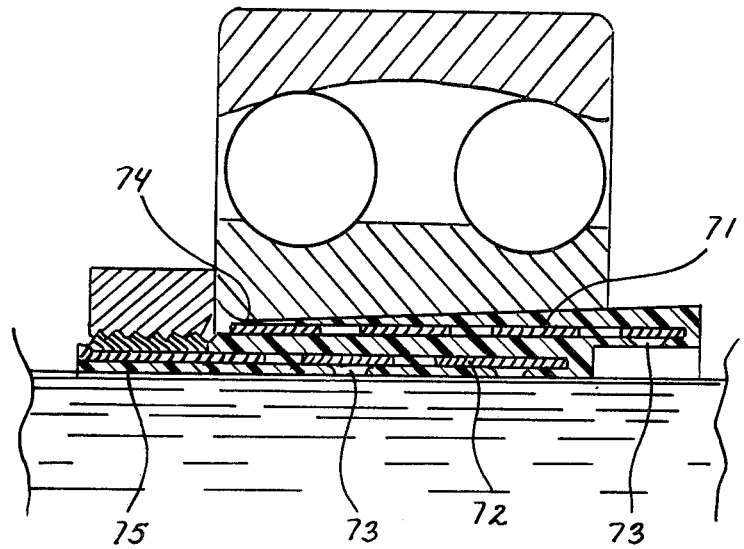
FIGS. 7 and 8 show further embodiments of the fastening of members having cylindrical bores.

FIG. 7 shows a ball bearing having a tapering centre bore. The fastening sleeve, which is used here for fastening the bearing, is designed with two sheet metal bodies 71 and 72. At the plastic moulding operation these two sheet metal bodies have been centred in mainly exactly the same way as described with references to FIGS. 1 and 2. The warts 73 will guide the bodies against central moulding mandrels, whereas the opposite ends 74 and 75 have circular metallic guides in the moulding forms.

Figure 8:
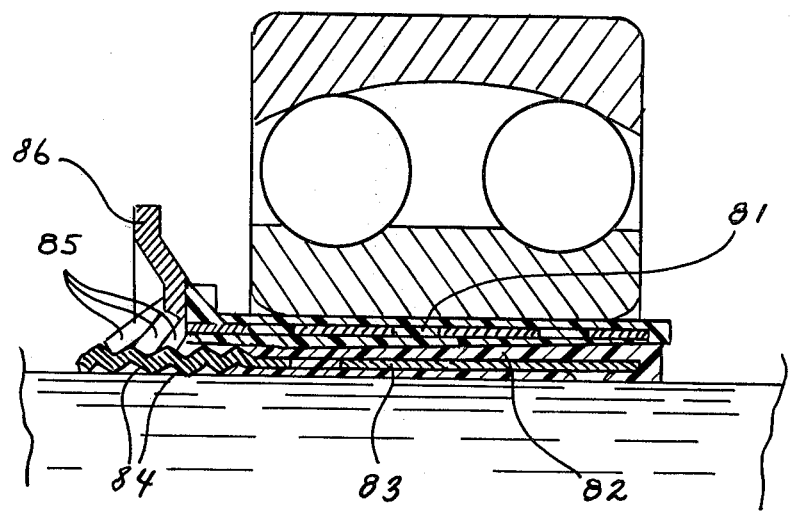

FIG. 8 finally shows two cooperating sleeves 81 and 82, where the sheet metal body 83 of the inner sleeve has been designed with threads 84 at one of its ends. These threads 84 cooperate with the teeth 85 designed in the form of threads on a clamping device 86, which has been stamped from sheet metal.

The fastening sleeve according to the present invention is very inexpensive to manufacture. Due to the fact that the sheet metal body is designed with stops in form of bulgings, sheet metal lugs which have been bent upwards or the like the insertion of the sheet metal body in the moulding form is very simple to effect and the entire moulding procedure will be swift. The mechanical strength of the fastening sleeve will be very high depending thereon that the comparatively small volume of plastic is moulded about the sheet metal sleeve and also depending thereon that the plastic is well anchored i.a. by means of perforations. At comparative test it has been found that the fastening sleeve according to the present invention will give as good a fastening as the conventional, much more expensive, earlier mentioned steel sleeve.

An advantage with the fastening sleeve according to the present invention is as mentioned hereabove that fretting corrosion is avoided as metallic contact between sleeve, shaft and the fastened machine member will appear only in certain points.

The sheet metal body can be manufactured rapidly and cheaply by stamping it from a thin steel band, whereby perforations, any threads and bulgings can be formed in one operation only.

Different types of moulding compounds which are suited for the present invention are earlier known. Among such compounds can be mentioned plastics of epoxy, polyester and other types having high strength. It is, of course, possible to use other moulding compounds instead of plastic.

The invention is not limited to the embodiments described but can be modified in several ways within the scope of the appended claims.

I claim:

1. A fastening sleeve assembly engageable with a press fit in the annular space between confronting annular surfaces of two members comprising an outer elongated generally tubular housing element made of a plastic material having at least one peripheral surface which tapers from one axial end to the other, at least one generally cylindrical slotted inner body element made of pressed sheet metal encapsulated by said housing element and having an axial end portion which projects outwardly beyond one axial end of said housing.

2. A fastening sleeve assembly as claimed in claim 1 wherein said sheet metal body element includes at least one opening therein through which the plastic of said housing engages to serve as anchoring means and at least one radial projection engaging through the peripheral surface of said housing to define a stop centering the sheet metal body element during a moulding process and providing a friction contact engaging the annular surface of one of the members.

3. A fastening sleeve as claimed in claim 1 including a threaded assembly ring mounted on the exposed axial end portion of the sheet metal body element adapted to receive a locking nut.

4. A fastening sleeve assembly as claimed in claim 3 including a pair of sleeve members, one of said sleeve members being of shorter axial length than the other and engageable by the locking nut at the exposed axial end portion thereof.

5. A fastening sleeve assembly as claimed in claim 1 including a coil mounted on the exposed axial end portion of said sheet metal body element which cooperates with a sheet metal clamping device having finger portions in the form of threads cooperating with the said coil to lock the assembly in.

6. A fastening sleeve assembly as claimed in claim 1 including a pair of superimposed sheet metal body elements encapsulated in said plastic housing.

7. A fastening sleeve assembly as claimed in claim 1 wherein said projecting axial end portion is formed with threads to receive a locking member.

8. A fastening sleeve assembly as claimed in claim 1 wherein said housing is split for its entire axial length to define a wedge shaped slot.

9. A fastening sleeve assembly as claimed in claim 1 wherein said sheet metal body element includes a plurality of openings and a plurality of angularly oriented lugs adjacent said openings, a portion of the edge of each opening being offset from the plane of the body element forming support points.

* * * * *